United States Patent [19]
Hiismäki

[11] Patent Number: 5,770,806
[45] Date of Patent: Jun. 23, 1998

[54] ACOUSTIC FLOW MEASUREMENT METHOD AND MEASUREMENT APPARATUS IMPLEMENTING THE METHOD

[75] Inventor: Pekka Hiismäki, Espoo, Finland

[73] Assignee: Valtion Teknillinen Tutkimuskeskus, Finland

[21] Appl. No.: 727,499
[22] PCT Filed: Mar. 29, 1995
[86] PCT No.: PCT/FI95/00168
  § 371 Date: Mar. 14, 1997
  § 102(e) Date: Mar. 14, 1997
[87] PCT Pub. No.: WO95/28619
  PCT Pub. Date: Oct. 26, 1995

[30] Foreign Application Priority Data

Apr. 19, 1994 [FI] Finland ................................. 941805

[51] Int. Cl.$^6$ ..................................................... G01F 1/00
[52] U.S. Cl. ..................................... 73/861.29; 73/861.27; 73/861.18
[58] Field of Search ........................... 73/861.18, 861.19, 73/861.25, 861.26, 861.27, 861.28, 861.29, 861.31

[56] References Cited

U.S. PATENT DOCUMENTS

| 4,011,755 | 3/1977 | Pedersen . | |
|---|---|---|---|
| 4,445,389 | 5/1984 | Potzick et al. | 73/861.27 |
| 4,831,884 | 5/1989 | Drenthen | 73/861.27 |
| 5,152,174 | 10/1992 | LaBudde | 73/861.02 |
| 5,228,347 | 7/1993 | Lowell et al. | 73/861.28 |
| 5,421,212 | 6/1995 | Mayranen et al. | 73/861.29 |
| 5,437,194 | 8/1995 | Lynnworth | 73/861.29 |

FOREIGN PATENT DOCUMENTS

| WO 9313390 | | | |
|---|---|---|---|
| A1 | 8/1993 | WIPO . | |
| WO 9313414 | | | |
| A1 | 8/1993 | WIPO . | |
| WO 9320411 | | | |
| A1 | 10/1993 | WIPO . | |

Primary Examiner—Richard Chilcot
Assistant Examiner—Max H. Noori
Attorney, Agent, or Firm—Jones & Askew

[57] ABSTRACT

An acoustic measurement method of flow measurement for determinating fluid flow velocity or other variables in a measurement pipe section by determining over an exactly determined length (±a±b) the downstream propagation time $T_D$ and upstream propagation time $T_U$ for naturally occurring or artificially generated acoustic wave modes propagating upstream and downstream in the pipe section in the form of plane wavefronts at a low frequency. Pairwise opposed transducers mounted on the pipe are configured by delaying, scaling and summing the signals into at least two direction-discriminating filters, of which one eliminates signals related to downstream acoustic waves while the other eliminates signals related to the upstream acoustic waves in the pipe. The output signals of direction-discriminating filters performing filtering in the same direction are compared with each other by forming a symmetrical equilibrium function with respect to their delay variable from (a) the cross correlation function, (b) the time integral of the squared difference, or (c) the time integral of the squared sum, of the output signals, whereby one of the alternative functions is computed for acoustic waves in both downstream and upstream directions. These equilibrium functions are maximally symmetrical with respect to their maxima or minima when the direction-discriminating filtering is properly made, and the correct values of the acoustic wavefront propagation times $T_D$ and $T_U$ for use in the computation of both the measurement result given by the method and the values of the delay time variables employed in the direction-discriminating filters are determined from these maximally symmetrical equilibrium functions.

10 Claims, 1 Drawing Sheet

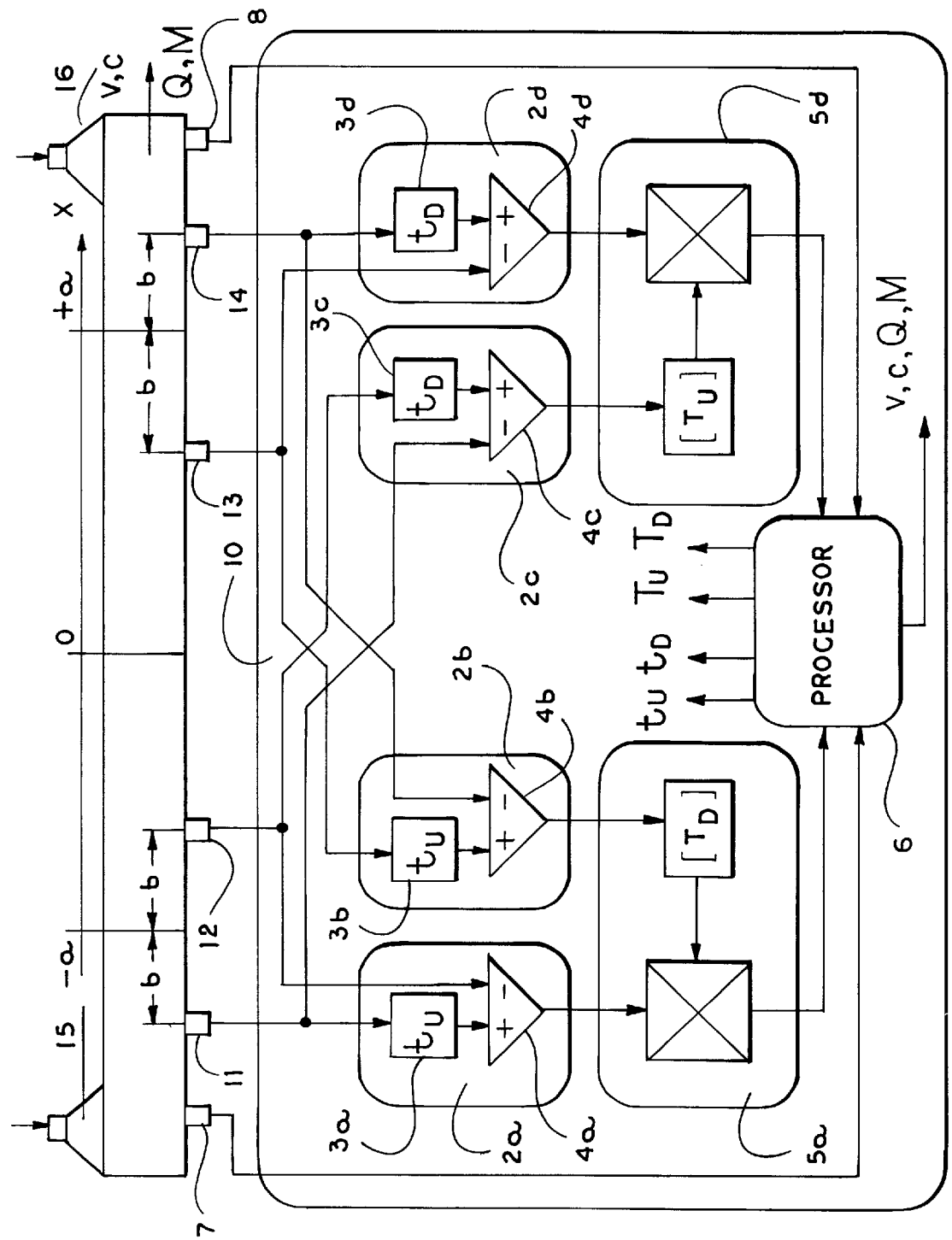

ACOUSTIC FLOW MEASUREMENT METHOD AND MEASUREMENT APPARATUS IMPLEMENTING THE METHOD

The present invention relates to an acoustic method of flow measurement for the determination of fluid flow velocity, volumetric flow and/or mass flow rate in a measurement pipe section by way of determining the downstream propagation time $T_D$ and upstream propagation time $T_U$ for naturally occurring and/or artificially generated acoustic wave modes propagating upstream and downstream in a measurement pipe section in the form of plane wavefronts at a low frequency.

Moreover, the invention concerns a measurement apparatus implementing the method according to the invention for the measurement of fluid flow velocity, volumetric flow and/or mass flow rate, said apparatus comprising a measurement pipe section in which the flow under measurement takes place, at least three acoustic transducers suited to convert the acoustic waves propagating in the measurement pipe section into an electrical signal.

With regard to the state of the art, reference is made to Finnish patents FI 76885, FI 88208 and FI 89835 and a plurality of prior-art patents cited therein.

As known in the art, when the frequency of an acoustic wave propagating in a pipe is smaller than a cutoff frequency determined by the pipe dimensions, the speed of sound in the measured medium and the acoustic coupling between the medium and the pipe, only a fundamental mode acoustic wave propagating in the form of a plane wavefront can travel in the pipe without attenuation. Further is known in the art that the phase velocity of such an acoustic piston-mode wavefront can be determined so that to the speed of sound in the medium at rest is added the flow velocity of the medium averaged over the pipe cross section using positive sign to obtain the phase velocity of the downstream wave and using negative sign to obtain the phase velocity of upstream wave, respectively. Hence, the phase velocities of fundamental-mode wavefronts are independent from the flow profile over the pipe cross section, which makes it possible to accomplish fluid velocity and/or volumetric measurements with a high accuracy [cf. B. Robertson, "Effect of arbitrary temperature and flow profiles on the speed of sound in a pipe", J. Acoust. Soc. Am., Vol. 62, No. 4, pp. 813–818, October 1977, and B. Robertson, "Flow and temperature profile independence of flow measurements using long acoustic waves", Transactions of the ASME, Vol. 106, pp. 18–20, March 1984]. Accurate methods based on the above-described principle for the measurement of the phase velocities of the downstream and upstream fundamental modes have been disclosed in the art.

It is an object of the present invention to further develop the measurement method based on the fundamental modes of acoustic waves and an apparatus implementing the method so as to achieve essential improvements in the accuracy of the method and its insensitivity to disturbance.

To achieve this goal of the invention and others to be described later in the text, the method according to the invention is principally characterized in that pairwise opposed transducers mounted on the measurement pipe section are configured by delaying, scaling and summing of the signals into at least two direction-discriminating filters of which one filter/one set of filters eliminates related to downstream acoustic waves while the other filter/other set of filters eliminates signals related to the upstream acoustic waves in the measurement pipe section (1);

the output signals of at least two direction-discriminating filters performing filtering in the same direction are compared with each other by forming a symmetrical equilibrium function with respect to their delay variable from a) the cross-correlation function of the filter output signals, b) the time integral of the squared difference of the output signals, or c) the time integral of the squared sum of the output signals, whereby one of the listed alternative functions is computed for acoustic waves in both downstream and upstream directions, said equilibrium functions being maximally symmetrical with respect to their maxima or minima; and the correct values of the acoustic wavefront propagation times $T_D$ and $T_U$ for use in the computation of both the measurement result given by the method and the values of the delay time variables employed in the direction-discriminating filters are determined from these, maximally symmetrical equilibrium functions with the help of a certain, predetermined algorithm.

Furthermore, the apparatus according to the invention is principally characterized in that the apparatus incorporates a digital signal processing unit for the processing of the electrical output signals produced by the acoustic transducers;

said signal processing unit comprises four direction-discriminating filters and two correlators for computing the symmetrical cross-correlation functions of signals corresponding to downstream acoustic waves only or upstream acoustic waves only, respectively; and said signal processing unit is further adapted to produce the values of the acoustic wavefront propagation times $T_D$ and $T_U$ as well as the flow measurement results derived thereof.

The invention is based on the novel principle that prior to the generation of any cross-correlation function to be employed for determining the downstream acoustic propagation time $T_D$ and the upstream acoustic propagation time $T_U$, the signals are subjected to direction-discriminating filtering in order to assure that both signals to be cross-correlated are related to either purely downstream or purely upstream propagating wavefronts, respectively. The direction-discriminating filtering for a virtual transducer located at a point x of the measurement pipe section can be accomplished by virtue of two transducers located at points x+b and x−b along the flow axis of the pipe section through subtracting the output signals of the transducers from each other so that prior to the subtraction, one of the transducer output signals is advanced and the other delayed by the estimated propagation time of the acoustic wavefront over the distance b. Simultaneously as the signal component related to a wavefront propagating in one direction is eliminated, the remaining signal will be subjected to filtering by a comb filter accomplishing the elimination of spectral components at certain bandstop frequencies of constant frequency spacing, while the spectral components falling between these bandstop frequencies will be amplified. A characterizing property of the invention is that the filtering procedure achieves high precision only when both the downstream and upstream acoustic wavefront propagation times are known exactly, which requirement is met by an iterative solution. Hence, the parameters of the direction-discriminating filters must be corrected as more accurate values are iterated for wavefront propagation times, and therefore, the filters are locked to follow the changes in the fluid flow velocity.

When applied prior to the computation of the cross-correlation function, the signal filtering procedure according to the present invention for eliminating the signal components of the acoustic wave travelling in the wrong direction offers the benefit that the cross-correlation function will be fully symmetrical irrespective of the shape of the frequency spectrum of the acoustic wave travelling in the correct direction provided that said spectrum contains also other low-frequency components below the cutoff frequency besides those to be eliminated by the above-mentioned comb filter. Then, at least in principle, a background acoustic signal emitted from outside the measurement pipe section if travelling in the fundamental mode is to the function of the measurement method according to the invention as useful as an acoustic wave particularly launched for the measurement purpose, and moreover, those two types of acoustic waves will not interfere with each other, but rather, augment each other. A precondition to such a favourable situation is, however, that no appreciable disturbing noise or reflections occur in the measurement pipe section itself between the acoustic transducers. Such disturbing acoustic signals are typically caused by branches of the flow pipe and other discontinuities thereof.

In its basic configuration, the measurement pipe section of the apparatus according to the invention is provided with four acoustic transducers, of which the two left-side transducers produce the signals for one direction-discriminating filter, while the two right-side transducers produce the signals to the other direction-discriminating filter. The apparatus incorporates a signal processing unit for generating the cross-correlation functions separately for the downstream and upstream acoustic waves, respectively. Furthermore, the apparatus incorporates a processor employed for computing the iteratively improved values of acoustic propagation time from the correlation function for the direction-discriminating filters advantageously so that the filters are constantly locked to perform realtime elimination of disturbing signals during variations in the flow velocity, whereby one filter operates on the downstream acoustic waves and the other on the upstream acoustic waves. An advantageous embodiment of the apparatus further incorporates pressure and temperature transducers serving to provide corrective signals so that the reading/output signal of the apparatus can be converted to the NTP values of, or alternatively, the mass flow rate of the gas under measurement.

In the following the invention is described in greater detail with reference to an embodiment of the invention illustrated in the FIGURE of the appended drawing, whereby the details of the illustrated embodiment must not be understood to limit the scope and spirit of the invention.

The FIGURE illustrates a schematic configuration, partially at a circuit block level, of a measurement apparatus suited to implement the method according to the invention.

With reference to the FIGURE, a measurement pipe section 1 is shown with a horizontal coordinate axis x parallel to the direction of the measured flow having the origin of the axis aligned to the midpoint of the pipe section 1. To the measurement pipe section 1 are mounted four acoustic transducers 11,12,13,14, of which transducer 11 is at point −a−b, transducer 12 at point −a+b, transducer 13 at point a−b, and transducer 14 at point a+b.

The signal processing unit 10 of the measurement apparatus incorporates four direction-discriminating filters 2a,2b, 2c and 2d as well as two correlator units 5a and 5b. Each of the direction-discriminating filters 2a–2d comprises one delay unit 3, of which units 3a and 3b delay the signal by a time delay $t_U$ and the units 3c and 3d by a time delay $t_D$, and one difference computing unit 4a,4b,4c and 4d. The correlator units 5a and 5b compute the cross-correlation functions of their input signals at a sufficiently high number of instants of time about the time instant corresponding to the maximum of the correlation function when the fluid flow velocity v in the measurement pipe section 1 may vary within a predetermined range of fluid flow velocity.

The output signals of the correlator units 5a and 5b are taken to a processor 6, whereby also the output signals of the temperature transducer 7 and the fluid pressure transducer 8 for the fluid temperature and pressure, respectively, of the fluid flowing in the measurement pipe section 1 are taken to the processor inputs. The processor 6 computes the wavefront propagation times $T_U$ and $T_D$ corresponding to the distance 2a, the wavefront propagation times $t_U$ and $t_D$ corresponding to the distance 2b, and the flow variables v,c,Q and/or M to be measured for the measurement pipe section 1. The propagation times are taken to the delay units 3a, 3b,3c and 3d, and to the correlator units 5a and 5b as the new input values of the 3b,3c and 3d, and to the correlator units 5a and 5b as the new input values of the propagation times for the next iterative measurement cycle. The measurement cycles are sequentially repeated under the control of the microprocessor 6, and said propagation times are iterated through as many successive measurement cycles as is necessary to achieved the desired measurement accuracy.

In a practical embodiment of the invention, the distances can be set equal, that is, a=b, whereby the transducers 12 and 13 are moved to the origin of the x-axis. Then, the number of required acoustic transducers will be reduced from four to three transducers 11,14,12=13 without departing from the spirit of the invention.

The acoustic waves propagating downstream and upstream in the measurement pipe section 1, respectively, can be expressed by equations $$D(x,t) = \exp(-Ax) \cdot D\left(t - \frac{x}{v_D}\right)$$

$$U(x,t) = \exp(+Ax) \cdot U\left(t - \frac{x}{v_U}\right)$$

where A is the linear coefficient of attenuation, $v_U$ is the velocity of the upstream fundamental mode acoustic wave and $v_D$ is the velocity of the downstream fundamental mode acoustic wave. Then the output signals of the four transducers 11, 12, 13 and 14 are $$LO(t) = \exp(+A(a+b)) \cdot D\left(t + \frac{a+b}{v_D}\right) +$$

$$\exp(-A(a+b)) \cdot U\left(t - \frac{a+b}{v_U}\right)$$

$$LI(t) = \exp(+A(a-b)) \cdot D\left(t + \frac{a-b}{v_D}\right) +$$

$$\exp(-A(a-b)) \cdot U\left(t - \frac{a-b}{v_U}\right)$$

$$RI(t) = \exp(-A(a-b)) \cdot D\left(t - \frac{a-b}{v_D}\right) +$$

$$\exp(+A(a-b)) \cdot U\left(t + \frac{a-b}{v_U}\right)$$

-continued
$$RO(t) = \exp(-A(a+b)) \cdot D\left(t - \frac{a+b}{v_D}\right) +$$
$$\exp(+A(a+b)) \cdot U\left(t + \frac{a+b}{v_U}\right)$$

The four direction-discriminating filters are next formed from these signals as their linear combinations $$\exp(-Ab) \cdot LO\left(t - \frac{b}{v_D}\right) - \exp(+Ab) \cdot LI\left(t + \frac{b}{v_D}\right) =$$
$$\exp(-A(a+2b)) \cdot U\left(t - \frac{a+b}{v_U} - \frac{b}{v_D}\right) -$$
$$\exp(-A(a-2b)) \cdot U\left(t - \frac{a-b}{v_U} + \frac{b}{v_D}\right)$$

$$\exp(-Ab) \cdot LI\left(t - \frac{b}{v_U}\right) - \exp(+Ab) \cdot LO\left(t + \frac{b}{v_U}\right) =$$
$$\exp(+A(a-2b)) \cdot D\left(t + \frac{a-b}{v_D} - \frac{b}{v_U}\right) -$$
$$\exp(+A(a+2b)) \cdot D\left(t + \frac{a+b}{v_D} + \frac{b}{v_U}\right)$$

$$\exp(-Ab) \cdot RI\left(t - \frac{b}{v_D}\right) - \exp(+Ab) \cdot RO\left(t + \frac{b}{v_D}\right) =$$
$$\exp(+A(a-2b)) \cdot U\left(t + \frac{a-b}{v_U} - \frac{b}{v_D}\right) -$$
$$\exp(+A(a+2b)) \cdot U\left(t + \frac{a+b}{v_U} + \frac{b}{v_D}\right)$$

$$\exp(-Ab) \cdot RO\left(t - \frac{b}{v_U}\right) - \exp(+Ab) \cdot RI\left(t + \frac{b}{v_U}\right) =$$
$$\exp(-A(a+2b)) \cdot D\left(t - \frac{a+b}{v_D} - \frac{b}{v_U}\right) -$$
$$\exp(-A(a-2b)) \cdot D\left(t - \frac{a-b}{v_D} + \frac{b}{v_U}\right)$$

As is evident from the equations above, the right sides of the first and third equations are equal with the exception of the constant factor exp (2Aa) and the constant shift $2a/v_U$. Resultingly, the cross-correlation function of the left sides of these equations are fully symmetrical with respect to the variable $2a/v_U$ provided that the variable $b/v_D$ is properly selected. Correspondingly, the right sides of the second and fourth equations are equal with the exception of the constant factor exp (2Aa) and the constant shift $2a/v_D$, whereby resultingly, also the cross-correlation function of the left sides of these equations are fully symmetrical with respect to the variable $2a/v_D$ provided that the variable $b/v_U$ is properly selected.

Instead of using the cross-correlation function, the time shift τ between two signals X(t) and X(t−τ) can be determined by minimizing the integral of the difference signal ∫[X(t)−X(t−τ)]²dt, or alternatively, maximizing the integral of the sum signal ∫[X(t)+X(t−τ)]²dt, whereby both functions are symmetrical functions with respect to τ provided that the integrals are extended over the area where the signals of the integrands can be presented in cyclic form, which is always possible for time series of finite length. Besides the above-mentioned requirement for symmetry, the important property of the above-given equations for determining the acoustic wavefront propagation time is that no assumptions need be made concerning the acoustic signals themselves. Hence, the equations are valid and can be used both for signals emitted at a single frequency signal as well as for a wide-band acoustic signal. However, in the case of a single-frequency signal, it must be noted that because certain frequencies will be effectively eliminated, the use of such frequencies must be avoided. At least in the range of small flow velocities, the acoustic emissions generated by the flow itself as well as those caused by pumps or blowers may be so weak as not to permit reliable flow measurement. Obviously, to counter such a situation and others, the flow measurement pipe section should be provided with actual sources of acoustic emissions capable of generating the downstream and upstream propagating waves. While not necessary in all embodiments, however, such acoustic sources are denoted in the FIGURE by reference numerals 15 and 16 representing loudspeakers which are mounted to the measurement pipe section 1 outside the measurement length −a−b, +a+b.

When a single-frequency acoustic wave is used, the duration of the measurement cycle is advantageously selected equal to an integer multiple of the cycle time of the acoustic wave in order to avoid truncation error in the computation of the correlation function. The possibility of using a single-frequency acoustic signal extends the applications of the method to liquids, too. In the case of liquid flow measurement, the measurement pipe section cannot be assumed to have stiff walls, but rather, having elastic walls, which results in dispersion of the acoustic wave making also the fundamental mode propagation velocity frequency-dependent. Yet, the use of a single-frequency acoustic signal for the flow measurement makes the method insensitive to frequency-dependent dispersion.

In the foregoing, only the downstream and upstream acoustic wavefront propagation times $T_D$ and $T_U$, respectively, have been considered over the measurement length $2a$. Obviously, the average flow velocity v, sound speed c in stationary fluid, volumetric flow Q and mass flow rate M can be solved according to the invention from equations $$v = a \cdot \frac{T_U - T_D}{T_U \cdot T_D}$$
$$c = a \cdot \frac{T_U + T_D}{T_U \cdot T_D}$$
$$Q = v \cdot S$$
$$M = Q \cdot \rho$$

where S is the cross section of the measurement pipe section 1 and ρ is the density of the gas to be measured. Up to the determination of the volumetric flow Q, the above-given variables are only dependent on the discussed wavefront propagation times and the dimensions of the measurement pipe section 1. If the volumetric flow reading is desired to be converted to the values of the gas at NTP, the measurement pipe section 1 is advantageously also provided with temperature and pressure transducers 7, 8 and their readings are used for conversion to NTP. When the volumetric flow Q converted to NTP is multiplied by a scaling factor dependent on the gas under measurement, the mass flow rate M is obtained.

A particularly advantageous application of the method is found in the measurement of mass flow rate M in large-diameter measurement pipe sections 1 for natural gas pipelines.

For those versed in the art it is obvious that the invention is not limited by the exemplifying embodiments described above, but rather, can be varied within the scope and inventive spirit of the appended claims.

I claim:

1. An acoustic method of flow measurement for the determination of fluid flow velocity (v), volumetric flow (Q) or mass flow rate (M) in a measurement pipe section have an axial direction by determining over an exactly determined length $2a$ the downstream propagation time $T_D$ and upstream propagation time $T_U$ for naturally occurring or artificially generated acoustic wave modes (15,16) propagating upstream and downstream in the measurement pipe section in the form of plane wavefronts of low frequency sound, comprising the steps of:

mounting two pairs of opposed transducers (11,12; 13,14), separated in the axial direction by a certain interpair distance ($2a$) and a certain intrapair distance ($2b$) on the measurement pipe section;

delaying, scaling, and summing signals from the transducers into four direction-discriminating filters ($2a$, $2b$, $2c$, $2d$) of which two filters ($2c$, $2d$) are tuned to eliminate signals related to downstream acoustic waves and two filters ($2a$, $2b$) are tuned to eliminate signals related to the upstream acoustic waves in the measurement pipe section;

comparing with each other the output signals of said two direction-discriminating filters by forming a symmetrical equilibrium function with respect to a delay variable about a true time shift between the said signals to be compared from (a) cross-correlation function, (b) a time integral function of squared difference, or (c) a time integral function of squared sum, of the output signals, whereby one of the alternative functions (a), (b), and (c) is computed for acoustic waves in both downstream and upstream directions, said equilibrium functions being maximally symmetrical with respect to their maxima or minima; and determining from any of said maximally correct symmetric equilibrium function (a,b,c), with the help of a certain predetermined algorithm, correct values of the acoustic wavefront propagation times $T_D$ and $T_U$ for use in the computation of both the measurement result given by the method and values of delay time variables to be employed in the direction-discriminating filters.

2. A measurement method as defined in claim 1, wherein the different steps of the measurement method are performed by a processor (5), whereby said processor (5) is employed for computing the acoustic wavefront propagation time $T_U$ and $T_D$ corresponding to the interpair distance ($2a$) between the two pairs of transducers (11,12) and (13,14) and for computing the wavefront propagation times $t_U$ and $t_D$ corresponding to the intrapair distance ($2b$) between the transducers (11,12) and (13,14), and the latter propagation times are taken to delay units ($3a$,$3b$,$3c$,$3d$) as the new input values of the propagation times for each new measurement cycle to be repeated iteratively for a sufficient number of times.

3. A method as defined in claim 1, wherein, the temperature and pressure of the flowing medium is measured in the method by means of respective transducers (7,8), the readings obtained from said transducers (7,8) are used to determined values of a gaseous medium under measurement at NTP, and the gas-dependent scaling factor thus obtained is used as the multiplier for the measured volumetric flow $Q = v \cdot S$ (S=cross section of the measurement pipe section), whereby multiplication gives the mass flow rate (M) of the gaseous medium under measurement.

4. A method as defined in claim 1, wherein, the interpair distance $2a$ between the pairs (11,12) and (13,14) of measurement transducers is selected to be the same as the intrapair distance ($2b$), whereby the measurement method can be implemented using three transducers of which the center transducer (that is, 12=13) acts as the second transducer in both pairs of transducers (11,12) and (13,14).

5. A method as defined in claim 1, wherein, the method is used for the measurement of flow velocity (v) of natural gas and also for the measurement of the mass flow rate (M) of natural gas.

6. A method as defined in claim 1, wherein the acoustic signal for the measurement is taken from the noise naturally occurring in the measurement pipe section mostly due to turbulence in the measurement arrangement or noise emitted by pumps and similar equipment or from specific acoustic wavefronts generated into the measurement pipe section by means of loudspeakers (15,16) operating from outside the measurement length $2a+2b$.

7. A measurement apparatus for the flow velocity (v), sound speed (c) in stationary fluid, volumetric flow (Q), or mass flow rate (M) of a fluid, said apparatus comprising:

a measurement pipe section (1) in which the flow under measurement takes place in an axial direction;

two pairs (11,12 and 13,14) of opposed acoustic transducers acoustically coupled to the pipe section with a certain interpair axial separation ($2a$) and a certain intrapair axial separation ($2b$) to convert the acoustic waves propagating in the measurement pipe section (1) into electrical signals,:

a digital signal processing unit (10) responsive to the signals produced by the acoustic transducers (11,12;13, 14);

said signal processing unit (10) comprising four direction-discriminating filters ($2a$,$2b$,$2c$,$2d$) of which two ($2c$, $2d$) of the filters are tuned to eliminate signals relating to downstream acoustic waves and another two ($2a$, $2b$) of the filters are tuned to eliminate signals relating to upstream acoustic waves in the pipe section, and two correlators ($5a$,$5b$) responsive to signals from the filters for computing the symmetrical cross-correlation functions of signals corresponding to upstream acoustic waves only or downstream acoustic waves only, respectively; and said signal processing unit (10) including a processor (6) responsive to the cross-correlation functions and operative in accordance with a predetermined algorithm to produce values of acoustic downstream wavefront propagation times $T_D$ and upstream propogation time $T_U$ over the interpair distance ($2c$) in the pipe section as well as flow measurement results (v,c, or M) derived thereof.

8. An apparatus as defined in claim 7, wherein;

said four direction-discriminating filters ($2a$,$2b$; $2c$,$2d$) include delay units ($3a$,$3b$,$3c$ $3d$) as well as difference units ($4a$,$4b$,$4c$,$4d$) and correlator units ($5a$,$5b$) connected to each other so that the output signals of the correlator units ($5a$,$5b$) are taken to the processor (6) which is operative to compute the acoustic wavefront propagation time ($T_D$,$T_D$) over the interpair distance (2a) between the transducer pairs (11,12 and 13,14), the wavefront propagation times $t_u, t_d$ over the intrapair distance (2b) between the transducers (11 and 12) as well as between transducers (13) and (14), and flow variables (v,c,Q or M) for the measurement pipe section under measurement.

9. An apparatus as defined in claim 7, wherein:

said apparatus includes temperature and pressure measuring transducers (7,8) operatively associated with the measurement pipe section to determine the temperature and pressure of the medium under measurement and to produce output signals supplied to said processor (6), whereby the processor provides NTP values or the mass flow rate of gas flowing through the pipe section.

10. An apparatus as defined in claim 7, wherein, in conjunction with the measurement pipe section (1), outside the measurement length determined by the outer pair of the acoustic transducers (11,14), loudspeakers (15,16) are operatively associated with the measurement pipe section for emitting a specific acoustic measurement signal into the measurement pipe section (1).

\* \* \* \* \*